(12) United States Patent
Fitzsimmons

(10) Patent No.: US 9,105,002 B2
(45) Date of Patent: *Aug. 11, 2015

(54) SYSTEM AND METHOD FOR PROVIDING INFORMATION TO A RECIPIENT OF A PHYSICAL MAIL OBJECT

(71) Applicant: Todd Fitzsimmons, Gardena, CA (US)

(72) Inventor: Todd Fitzsimmons, Gardena, CA (US)

(73) Assignee: Secured Mail Solutions, LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/528,675

(22) Filed: Oct. 30, 2014

(65) Prior Publication Data

US 2015/0066796 A1    Mar. 5, 2015

Related U.S. Application Data

(63) Continuation of application No. 13/848,370, filed on Mar. 21, 2013, now Pat. No. 8,910,860, which is a continuation of application No. 13/560,306, filed on Jul. 27, 2012, now Pat. No. 8,429,093, which is a continuation of application No. 13/297,515, filed on Nov. 16, 2011, now Pat. No. 8,260,629, which is a continuation of application No. 12/454,052, filed on May 11, 2009, now Pat. No. 8,073,787, which is a continuation of application No. 10/271,471, filed on Oct. 15, 2002, now Pat. No. 7,818,268.

(60) Provisional application No. 60/330,031, filed on Oct. 16, 2001.

(51) Int. Cl.
*G06F 17/00* (2006.01)
*G06Q 10/08* (2012.01)
*G06Q 10/10* (2012.01)
*G06Q 20/38* (2012.01)
*G06Q 30/02* (2012.01)
*H04L 12/58* (2006.01)
*H04W 4/12* (2009.01)

(52) U.S. Cl.
CPC .......... *G06Q 10/083* (2013.01); *G06Q 10/0832* (2013.01); *G06Q 10/107* (2013.01); *G06Q 20/382* (2013.01); *G06Q 30/0241* (2013.01); *H04L 12/585* (2013.01); *H04L 51/12* (2013.01); *H04W 4/12* (2013.01)

(58) Field of Classification Search
CPC . G06Q 10/083; G06Q 10/107; G06Q 20/382; G06Q 30/0241; G06Q 10/0832; G06Q 10/08; G06Q 10/10; G06F 17/00
USPC ............. 235/375, 487, 462.01; 705/401–402, 705/408, 1.1, 64
See application file for complete search history.

(56) References Cited

U.S. PATENT DOCUMENTS

| | | | |
|---|---|---|---|
| 2003/0110144 A1* | 6/2003 | Sansone | 705/406 |
| 2004/0143650 A1* | 7/2004 | Wollowitz | 709/219 |
| 2008/0291486 A1* | 11/2008 | Isles et al. | 358/1.15 |
| 2009/0119219 A1* | 5/2009 | Bleumer | 705/62 |

* cited by examiner

Primary Examiner — Edwyn Labaze

(57) ABSTRACT

A system and method is provided for transmitting information over a wide area network, such as the Internet, in response to receiving at least a portion of mail data. In one embodiment of the present invention, information is stored in a memory. Mail data is then affixed to a mail object. The mail object is then manually delivered to a recipient. The mail data is then provided to a reception device. The reception device then uses the mail data to retrieve the information from a mail device in communication with the memory. In a preferred embodiment, the mail data includes data corresponding to the recipient of the mail object, and the information includes data that identifies the recipient of the mail object and data that corresponds to a content of the mail object.

20 Claims, 3 Drawing Sheets

SYSTEM AND METHOD FOR PROVIDING INFORMATION TO A RECIPIENT OF A PHYSICAL MAIL OBJECT

CROSS-REFERENCE TO RELATED APPLICATION

This application is a continuation of U.S. patent application Ser. No. 13/848,370, filed Mar. 21, 2013, which is a continuation of U.S. patent application Ser. No. 13/560,306, filed Jul. 27, 2012, and issued on Apr. 23, 2013 as U.S. Pat. No. 8,429,093, which is a continuation of U.S. patent application Ser. No. 13/297,515, filed Nov. 16, 2011, and issued on Sep. 4, 2012 as U.S. Pat. No. 8,260,629, which is a continuation of U.S. patent application Ser. No. 12/454,052, filed May 11, 2009, and issued on Dec. 6, 2011 as U.S. Pat. No. 8,073,787, which is a continuation of U.S. patent application Ser. No. 10/271,471, filed Oct. 15, 2002, and issued on Oct. 19, 2010 as U.S. Pat. No. 7,818,268, which claims the benefit pursuant to 35 U.S.C. §119(e) of U.S. Provisional Patent Application No. 60/330,031 filed Oct. 16, 2001, which applications are specifically incorporated herein, in their entirety, by reference.

BACKGROUND OF THE INVENTION

1. Field of the Invention

The present invention relates to mail verification, and more particularly to a system and method of authenticating at least one mail object by providing at least a portion of mail identification data over a wide area network, such as the Internet, in order to receive mail verification data.

2. Description of Related Art

Currently there are two ways to provided mail objects (e.g., letters, documents, packages, etc.) to an end user; that being electronically (e.g., email, etc.) and through traditional mail services (e.g., U.S. Postal Service, Federal Express, UPS, Courier, etc.). However, because certain mail objects cannot be delivered electronically (either because its impossible or impractical), they are delivered using traditional mail services.

There are several problems with delivering mail objects through traditional mail services. First, the mail object is typically secured inside packaging (e.g., envelops, boxes, etc.) before it is provided to the mail service. Thus, neither the mail service nor the recipient is aware of the contents of the package until such package is opened by the recipient. This creates a problem in that hazardous mail objects (i.e., Anthrax, explosives, etc.) are not detected until they are opened by the recipient, thus exposing the recipient to the hazardous material. It also creates a problem in that mail objects (in general) are not known until they are opened by the recipient, thus making it difficult for the recipient (or his designee) to properly screen, sort or avoid certain mail objects (e.g., offensive mail, annoying mail, etc).

Second, a manually delivered mail object is limited to a one-way production of a finite set of information and/or products. This becomes problematic when the sender of the mail object is interested in providing or receiving additional information (e.g., product instructions, warranty information, etc.). Finally, contents that can be delivered electronically (e.g., advertisements, software, etc.) are often included in mail objects that are delivered via traditional mail services. The drawback with this is that it increases the cost associated with producing and/or delivering the mail object and increase the size of the mail object. For at least these reasons, a need exists in the industry for a system and method of providing mail verification data in response to receiving mail ID data over a wide area network, such as the Internet.

SUMMARY OF THE INVENTION

The present invention provides a system and method for providing mail verification data over a wide area network, such as the Internet, in response to receiving and authenticating at least a portion of mail identification (ID) data. Preferred embodiments of the present invention operate in accordance with at least one reception device, a mail identification (ID) device, a memory, and a mail verification application adapted to communicate with the reception device over a wide area network, such as the Internet. Specifically, the mail verification application is adapted to store at least a verifying portion of mail ID data in memory. In one embodiment of the present invention, the verifying portion of the mail ID data includes an identifiable code portion (e.g., an alpha code, a numeric code, an alphanumeric code, a symbolic code, a digital code, etc.), a shipping portion (e.g., ship date, shipping location, shipping method, etc.) and/or a recipient portion (e.g., the recipients name, address, email address, IP address, account number, social security number, etc.). The mail ID data is then affixed to a mail object. The mail object, which may further include a mail-to-address, a return-mail-address, and/or postage, is then manually delivered to a recipient. In one embodiment of the present invention, the mail ID data further includes mail-to-address data, return-mail-address data, and/or postage data.

At least an authenticating portion of the mail ID data is then provided to the reception device. The reception device, which communicates with the mail ID device over a wide area network, transmits at least the authenticating portion of the mail ID data to the mail verification application operating on the mail ID device. The mail verification application then compares the authenticating portion of the mail ID data with the verifying portion stored in memory. If the authenticating portion corresponds to the verifying portion (e.g., matches, is reasonably related, etc.), then mail verification data is sent to the reception device. In one embodiment of the present invention, at least a portion of the mail verification data includes authenticating data (indicating that the mail ID data has been authenticated), securing data (indicating who secured the mail object), sender data (indicating who sent the mail object), recipient data (indicating the intended recipient of the mail object) and/or additional data (e.g., the contents of the mail object, downloadable product data, sender web-page information, third party advertisements, etc).

In one embodiment of the present invention, the mail ID device further includes an input device adapted to provide at least a verifying portion of the mail ID data to the mail verification application and/or an output device adapted to affix the mail ID data on the mail object. In another embodiment of the present invention, the reception device includes an input device for receiving at least an authenticating portion of the mail ID data from the mail object and/or a mail authenticating application adapted to receive at least the authenticating portion of the mail ID data from the input device and provide at least the authenticating portion of the mail ID data to the mail ID device. In another embodiment of the present invention, the U.S. Postal Service (or an interim authenticating or screening entity) is the recipient of the mail object, thus interacting with the reception device to receive mail verification data.

A more complete understanding of the system and method for providing mail verification data in response to receiving at least a portion of mail ID data will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method for providing mail verification data over a wide area network, such as the Internet, in response to receiving and authenticating at least a portion of mail identification (ID) data. In the detailed description that follows, like element numerals are used to describe like elements illustrated in one or more figures.

Figure 1:
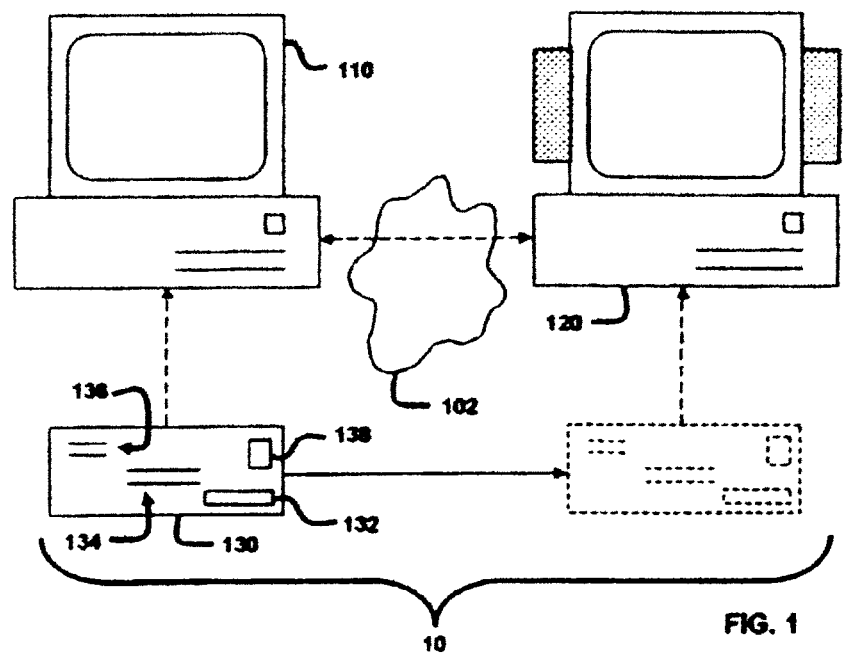
FIG. 1 illustrates one embodiment of the mail verification system.
Figure 2:
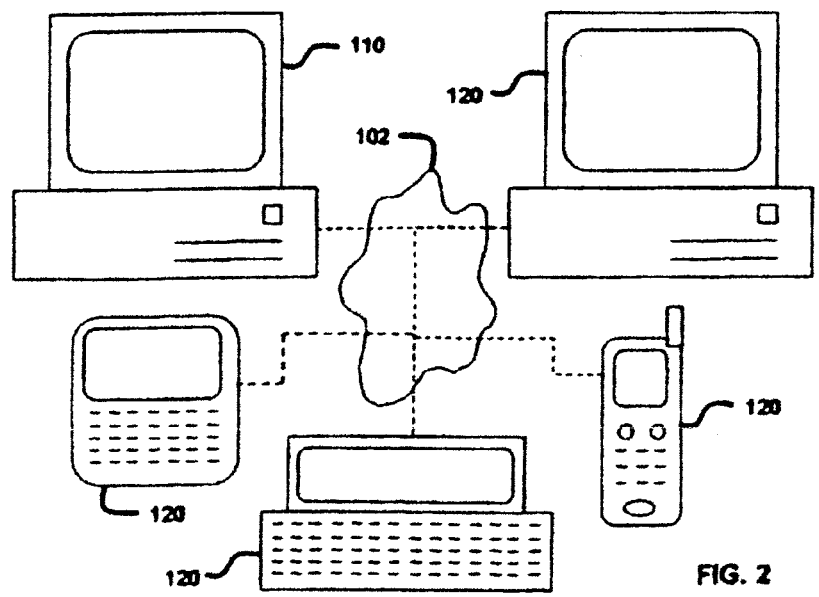
FIG. 2 illustrates a mail ID device communicating with a plurality of reception devices over a wide area network, such as the Internet.

Preferred embodiments of the present invention operate in accordance with at least one reception device, a mail identification (ID) device, a memory, and a mail verification application adapted to communicate with the reception device over a wide area network, such as the Internet. FIG. 1 illustrates one embodiment of the mail verification system 10, which includes a mail ID device 110 and a reception device 120 communicating through a wide area network 102, such as the Internet. It should be appreciate, as depicted in FIG. 2, that the reception device(s) 120 includes, but is not limited to, personal computers, set top boxes, personal digital assistances (PDAs), mobile phones, land-line phones, televisions, bar code readers, and all other physically and wirelessly connected reception devices generally known to those skilled in the art. It should further be appreciated that the number of reception devices 120 depicted in FIGS. 1 and 2 are merely to illustrate how the present invention operates, and are not intended to further limit the present invention.

Figure 3:
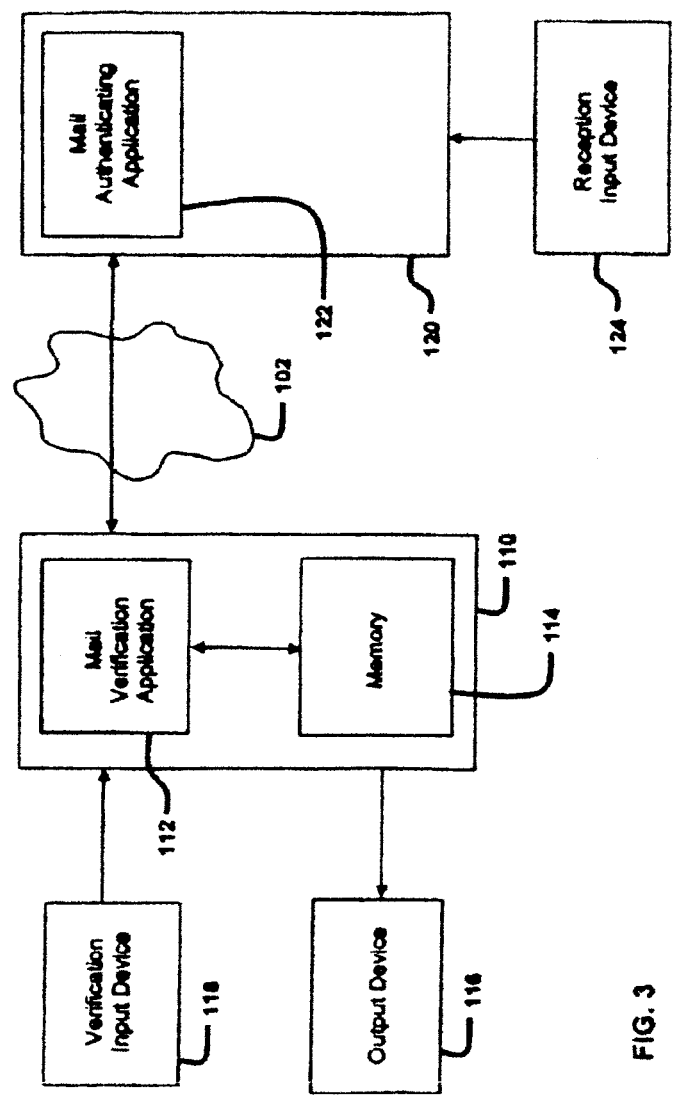
FIG. 3 illustrates one embodiment of the mail ID device and the reception device depicted in FIG. 1.

As shown in FIG. 3, the mail ID device 110 further includes a mail verification application 112 and a memory 114. The mail verification application 112 is adapted to store at least a portion (i.e., a verifying portion) of mail ID data in the memory 114, receive at least a portion (i.e., an authenticating portion) of mail ID data from the reception device 120, and provide mail verification data if the portion of the mail ID data received from the reception device 120 is authenticated. It should be appreciated that the mail verification application 112 may further be adapted to generate the mail ID data and provide it to an external device (e.g., a printer, etc.) or receive at least a verifying portion of the mail ID data from an external device (e.g., a scanner, etc.). It should also be appreciated that the mail verification application 112 may exist as a single application, or as multiple applications (locally and/or remotely stored) that operate together to perform the verification functions as described herein. It should further be appreciated that the location of the memory device 114 depicted in FIG. 3 is not intended to further limit the present invention. Thus, a memory device that is, for example, external to the mail ID device 110 is within the spirit and scope of the present invention.

Referring back to FIG. 1, where the dashed arrows indicate data transactions and the solid arrow indicates physical movement, mail ID data 132 is affixed to a mail object 130 (as used in its broader sense to include, but is not limited to, the packaging that surrounds the mail object). It should be appreciated that mail ID data can be encoded/encrypted (e.g., using bar code data, digital data, etc.) to prevent fraudulent usage. It should further be appreciated that affixing the mail ID data 132 on the mail object 130 includes, but is not limited to, printing or attaching mail ID data directly on the outer surface of the mail object 130 or printing/storing the mail ID data 132 on labels, ICs, smart cards, RFID tags, or any other data storage devices (or materials) generally known to those skilled in the art, and attaching them to the outer surface of the mail object 130. It should also be appreciated that the location of the mail ID data 132 on the mail object 130 in FIG. 1 is merely to exemplify how the invention operates, and is not intended to further limit the present invention. Thus, affixing the mail ID data 132 in some other location, such as over the sealing flap of an envelope, is within the spirit and scope of this invention.

At least a portion (i.e., a verifying portion) of the mail ID data 132 (either before or after the mail ID data is affixed) is stored in the mail ID device 110, or more particular (as shown in FIG. 3) in a memory 114 located within the mail ID device 110. Specifically, the mail verification application 112 either receives or generates at least the verifying portion of the mail ID data 132. The verifying portion is then stored in the memory 114. In one embodiment of the present invention, the verifying portion of the mail ID data includes a identifiable code portion (e.g., an alpha code, a numeric code, and alpha-numeric code, a symbolic code, a digital code, etc.), a shipping portion (e.g., ship date, shipping location, shipping method, etc.), and/or a recipient portion (e.g., the recipients name, address, email address, IP address, account number, social security number, etc.). The mail object 130, which may further include a mail-to-address 134, a return-mail-address 136, and/or postage 138, can then be manually delivered to a recipient. It should be appreciated that the mail ID data 132 can also be encoded (e.g., in a bar code, etc.) to include mail-to-address data, return-mail-address data, and/or postage data. In other words, for example, mail ID data could be encoded to include both coded data and postage-account data.

Once the recipient (or their designee) receives the mail object 130, at least an authenticating portion of the mail ID data 132 is provided to the reception device 120. The reception device 120, which communicates with the mail ID device 110 over a wide area network 102, transmits at least the authenticating portion of the mail identification data to the mail verification application 112 operating on the mail ID device 110. The mail verification application 112 then compares the authenticating portion of the mail ID data with the verifying portion stored in memory 114. If the received portion is authenticated, or corresponds to the verifying portion (e.g., matches, is reasonably related, etc.), then mail verification data is sent to the reception device 120.

In one embodiment of the present invention, at least a portion of the mail verification data includes authenticating data (e.g., image data, audio data, etc.) indicating that the mail ID data has been authenticated. This would allow, for example, the reception device 120 to produce at least one authenticating image on a display and/or perform at least one authenticating sound on a speaker. In another embodiment of the present invention at least a portion of the mail verification data includes securing data (indicating who secured the mail object), sender data (indicating who sent the mail object), recipient data (indicating who is to receive the mail object) and/or additional data (e.g., the contents of the mail object, downloadable product data, sender web-page data, third party advertisements, etc).

In another embodiment of the present invention, the mail ID device and/or the reception device further include an input device (e.g., 118, 124) adapted to receive at least a portion of the mail ID data. It should be appreciated that that the input devices depicted and discussed herein (e.g., 118, 124) include, but are not limited to, scanners (e.g., bar code scanners, etc.), keyboards, RFID readers, smart card readers, IC readers, and all other input devices generally known to those skilled in the art.

In another embodiment of the present invention, the mail ID device further includes an output device 116 adapted to affix (e.g., print, store, etc.) the mail ID data on the mail object. It should be appreciated that affixing the mail ID data on the mail object includes, but is not limited to, printing or attaching mail ID data directly on the outer surface of the mail object or printing/storing the mail ID data on labels, ICs, smart cards, RFID tags, or any other data storage devices (or materials) generally known to those skilled in the art, and attaching them to the outer surface of the mail object. It should further be appreciated that the output device depicted and described herein (e.g., 116) includes, but is not limited to, printers, data storage device (e.g., device capable of storing data on ICs, smart cards, RFID tags, etc.), and all other output devices generally known to those skilled in the art.

In another embodiment of the present invention, as shown in FIG. 3, the reception device 120 further includes a mail authenticating application 122 adapted to receive at least the authenticating portion of the mail ID data from the input device 124 and provide at least the authenticating portion of the mail ID data to the mail ID device. It should be appreciated that the mail authenticating application 122 may exist as a single application, or as multiple applications (locally and/or remotely stored) that operate together to perform the authenticating functions as described herein.

In one embodiment of the present invention, the mail ID data further includes software-booting data adapted to boot the mail authenticating application, an email application and/or a browser application. Either one of these applications could then be used to provide at least an authenticating portion of said mail ID data to said mail ID device, provide additional information to said mail ID device (or the sender of the mail object), and/or receive additional information from either the mail ID device, the sender of the mail object, or a third-party. In another embodiment, the mail verification data further includes software-booting data adapted to boot an email application and/or a browser application. Either one of these applications could then be used to provide additional information to the mail ID device and/or receive additional information from either the mail ID device, the sender of the mail object, or a third party.

In another embodiment of the invention, the reception device 120, or more particularly the mail authenticating application 122 is adapted to provide a reply email to the mail ID device 130 or the sender of the mail object. This reply email may either be sent automatically, to acknowledge the reception of the mail ID data and/or mail verification data, or manually, to allow the recipient to communicate with the mail ID device and/or sender of the mail object. In another embodiment of the invention the mail verification application 112 is adapted to provide the mail verification data to the reception device 120 via an email.

In another embodiment of the present invention, the U.S. Postal Service (or an interim authenticating or screening entity) is the recipient (as defined by this application) of the mail object 130, thus interacting with the reception device 120 to receive mail verification data. If mail is authenticated (or approved in the case of screening), the mail object 130 is forwarded on to the actual intended recipient.

Figure 4:
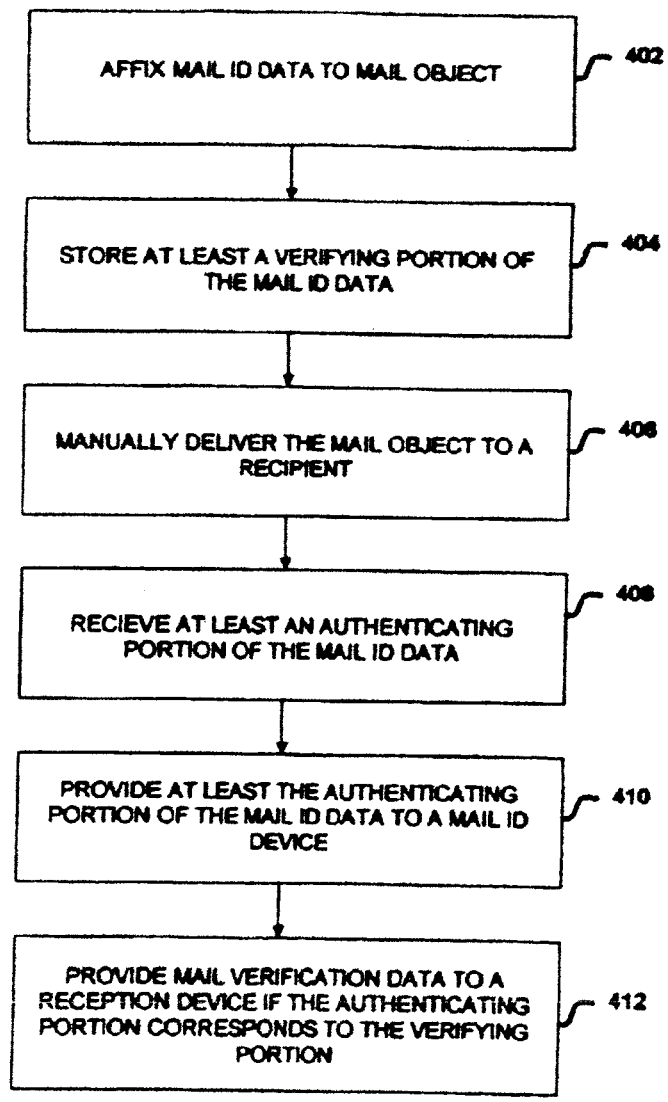
FIG. 4 is a flow chart illustrating one method of providing mail verification data in response to receiving at least a portion of mail ID data.

FIG. 4 is a flow chart illustrating one method of providing mail verification data in response to receiving at least a portion of the mail ID data. Specifically, in step 402 mail ID data is affixed to a mail object. At step 404, a verifying portion of the mail ID data is stored in a memory device. The mail object is then delivered to its recipient (or designee) at step 406. At step 408, a reception device receives at least an authenticating portion of the mail ID data. The reception device then provides at least the authenticating portion to a mail ID device at step 410. If the authenticating portion of the mail ID data corresponds to the verifying portion of the mail ID data, then mail verification data is provided to the reception device at step 412. It should be appreciated that storing the verifying portion of the mail ID data before the mail ID data is affixed to the mail object is within the spirit and scope of the present invention.

Having thus described multiple embodiments of a system and method of providing mail verification data in response to receiving mail ID data, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A method for providing electronic data to a recipient of a mail object, comprising:
    using an output device to affix a single set of mail ID data to said mail object, said single set of mail ID data including at least recipient data, said recipient data comprising a personalized network address associated with said recipient of said mail object;
    submitting said mail object to a mail carrier for delivery to said recipient of said mail object;
    receiving said recipient data from a reception device of said recipient via a network; and
    providing by at least one processor said electronic data to said reception device via said network in response to receiving said recipient data, said electronic data comprising a sender's web page that identifies said recipient of said mail object and includes data corresponding to a content of said mail object;
    wherein said electronic data is configured to be displayed to said recipient via a web browser on a display of said reception device.

2. The method of claim 1, further comprising providing by said at least one processor a second set of electronic data to a sender of said mail object indicating that said recipient requested said electronic data.

3. The method of claim 2, wherein said second set of electronic data includes at least a portion of said recipient data.

4. The method of claim 2, wherein said second set of electronic data includes data corresponding to said mail object.

5. The method of claim 2, wherein said second set of electronic data includes data corresponding to said mail object.

6. The method of claim 1, wherein said step of affixing said single set of mail ID data to said mail object, further comprises encoding said single set of mail ID data prior to being affixed to said mail object.

7. The method of claim 1, wherein said reception device is a cellular telephone.

8. The method of claim 7, wherein said electronic data is formatted for being displayed via a web browser on said cellular telephone.

9. A system for providing electronic data to a recipient of a mail object, said mail object including a single set of mail ID data that includes at least recipient data, comprising:
   at least one database for storing at least a first set of electronic data;
   a mail device; and
   at least one application operating on at least said mail device, said at least one application being in communication with said at least one database and a reception device of said recipient having at least an input device and a display, and being configured to:
      receive said recipient data from said reception device, said recipient data including personalized data that can be used to identify said recipient of said physical mail object; and
      provide said first set of electronic data to said reception device via said network in response to receiving said recipient data, said first set of electronic data comprising a sender's web page that identifies said recipient and includes data corresponding to a content of said mail object;
      wherein one of receiving said recipient data from said reception device and providing said first set of electronic data to said reception device results in a second set of electronic data being provided to said sender of said mail object.

10. The system of claim 9, wherein said at least one application is further configured to encode said single set of mail ID data and to affix said single set of encoded data on said mail object.

11. The system of claim 9, wherein said at least one application is further configured to generate an email addressed to said recipient in response to receiving said recipient data.

12. The system of claim 9, wherein said second set of electronic data includes at least a portion of said recipient data.

13. The system of claim 9, wherein said second set of electronic data includes data corresponding to said recipient of said mail object.

14. The system of claim 13, wherein said at least one application is further configured to provide said second set of electronic data to said sender via a web page.

15. The system of claim 9, wherein said second set of electronic data includes data corresponding to said reception device.

16. A system for providing electronic data to a recipient of a mail object, said mail object including a single set of mail ID data that includes at least recipient data, wherein said recipient data corresponds to said recipient of said mail object, comprising:
   a processor;
   at least one database for storing at least said electronic data; and
   at least one application operating on at least said processor, configured to:
      affix the single set of mail ID data to said mail object, said mail object being submitted to a mail carrier for delivery to said recipient of said mail object;
   at least one other application in communication with at least a reception device of said recipient having at least one input device for receiving said recipient data from said mail object, said at least one other application being configured to:
      receive said recipient data from said reception device; and
      provide said electronic data to said reception device via a network in response to receiving said recipient data, said electronic data including a sender's web page that identifies said recipient and includes data that corresponds to a content of said mail object;
      wherein one of receiving said recipient data and providing said electronic data results in other electronic data being provided to a sender of said mail object.

17. The system of claim 16, wherein said reception device is a cellular telephone.

18. The system of claim 17, wherein said electronic data is formatted for being displayed via a web browser operating on said cellular telephone.

19. The system of claim 16, wherein said other electronic data includes at least one of at least a portion of said recipient data and data corresponding to said recipient of said mail object.

20. The system of claim 16, wherein said single set of mail ID data is encoded before it is affixed to said mail object.

* * * * *